(12) United States Patent
Sakurasawa

(10) Patent No.: US 9,086,684 B2
(45) Date of Patent: Jul. 21, 2015

(54) ATTACHMENT STRUCTURE FOR VIBRATING MOTOR AND ELECTRONIC DEVICE

(75) Inventor: Tadashi Sakurasawa, Higashi-Kurume (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 309 days.

(21) Appl. No.: 13/572,919

(22) Filed: Aug. 13, 2012

(65) Prior Publication Data

US 2013/0051199 A1 Feb. 28, 2013

(30) Foreign Application Priority Data

Aug. 22, 2011 (JP) ................................. 2011-180261

(51) Int. Cl.
- *G04C 3/14* (2006.01)
- *G04G 17/04* (2006.01)
- *H02K 5/24* (2006.01)

(52) U.S. Cl.
CPC .................. *G04C 3/14* (2013.01); *G04G 17/04* (2013.01); *H02K 5/24* (2013.01)

(58) Field of Classification Search
CPC ............ G04C 3/14; G04C 3/16; G04G 17/04; H02K 5/24
USPC ........................ 368/10, 13, 72–74, 230, 250
See application file for complete search history.

(56) References Cited

U.S. PATENT DOCUMENTS

| | | | | |
|---|---|---|---|---|
| 4,342,105 A | * | 7/1982 | Dorfman | 368/88 |
| 4,920,525 A | * | 4/1990 | Meister | 368/250 |
| 5,023,853 A | * | 6/1991 | Kawata et al. | 368/230 |
| 5,282,181 A | * | 1/1994 | Entner et al. | 368/73 |
| 5,365,497 A | * | 11/1994 | Born | 368/230 |
| 5,657,205 A | | 8/1997 | Tamaru et al. | |
| 5,898,364 A | | 4/1999 | Gotou | |
| 6,388,349 B1 | * | 5/2002 | Ioka et al. | 310/81 |
| 6,563,242 B2 | * | 5/2003 | Ibata et al. | 310/90 |
| 6,674,196 B2 | * | 1/2004 | Ibata | 310/81 |
| 7,050,360 B2 | * | 5/2006 | Saito | 368/230 |
| 7,268,673 B2 | * | 9/2007 | Wolff | 340/407.1 |
| 7,525,225 B2 | | 4/2009 | Uchiumi et al. | |

(Continued)

FOREIGN PATENT DOCUMENTS

| | | |
|---|---|---|
| CN | 1875533 A | 12/2006 |
| JP | 08051286 A | 2/1996 |

(Continued)

OTHER PUBLICATIONS

Japanese Office Action (and English translation thereof) dated Apr. 16, 2015, issued in counterpart Japanese Application No. 2011-180261.

Chinese Office Action dated May 6, 2014 issued in counterpart Chinese Application No. 201210295906.1.

*Primary Examiner* — Vit W Miska

(74) *Attorney, Agent, or Firm* — Holtz, Holtz, Goodman & Chick PC

(57) ABSTRACT

An attachment structure for a vibrating motor, in which a cut-out section for forming a mounting space for a vibrating motor is provided in a housing that is housed within a device case with a portion thereof that corresponds to the vibrating motor being in close contact with the inner surface of the device case, and a circuit board is arranged in a non-contact state relative to the housing.

3 Claims, 9 Drawing Sheets

(56) References Cited

U.S. PATENT DOCUMENTS 7,646,122 B2 * 1/2010 Uchiumi et al. .............. 310/81
2006/0138885 A1 * 6/2006 Uchiumi et al. .............. 310/81

FOREIGN PATENT DOCUMENTS

| | | |
|---|---|---|
| JP | 10066291 A | 3/1998 |
| JP | 2011-112460 A | 6/2011 |

* cited by examiner

ATTACHMENT STRUCTURE FOR VIBRATING MOTOR AND ELECTRONIC DEVICE

CROSS-REFERENCE TO RELATED APPLICATION

This application is based upon and claims the benefit of priority from the prior Japanese Patent Application No. 2011-180261, filed Aug. 22, 2011, the entire contents of which is incorporated herein by reference.

BACKGROUND OF THE INVENTION

1. Field of the Invention

The present invention relates to an attachment structure for a vibrating motor used in electronic devices such as wristwatches and mobile phones, and an electronic device.

2. Description of the Related Art

A wristwatch structure is known in which a circuit board is arranged in a housing inside a wristwatch case, a cut-out portion is provided in the circuit board, and a vibrating motor is arranged in an area corresponding to the cut-out portion, as described in Japanese Patent Application Laid-Open (Kokai) Publication No. 2011-112460.

SUMMARY OF THE INVENTION

An object of the present invention is to provide an attachment structure for a vibrating motor capable of sufficiently reducing the size of an entire device, preventing adverse effects on the circuit board by vibration and efficiently transmitting vibration to the device case, and an electronic device using this attachment structure.

In order to achieve the above-described object, in accordance with one aspect of the present invention, there is provided an attachment structure for a vibrating motor comprising: a housing which is arranged within a device case and houses a vibrating motor; and a circuit board which is provided with a cut-out section for forming a mounting space for the vibrating motor, wherein the housing is housed within the device case with a portion of the housing that corresponds to the vibrating motor being in close contact with an inner surface of the device case, and the circuit board is arranged in a non-contact state relative to the housing.

In accordance with another aspect of the present invention, there is provided an electronic device comprising: a device case; a housing which is arranged within the device case and houses a vibrating motor; and a circuit board which is provided with a cut-out section for forming a mounting space for the vibrating motor and arranged in the housing, wherein the housing is housed within the device case with a portion of the housing that corresponds to the vibrating motor being in close contact with an inner surface of the device case, and the circuit board is arranged in a non-contact state relative to the housing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment in which the present invention has been applied to a wristwatch will hereinafter be described with reference to FIG. 1 to FIG. 8.

Figure 1:
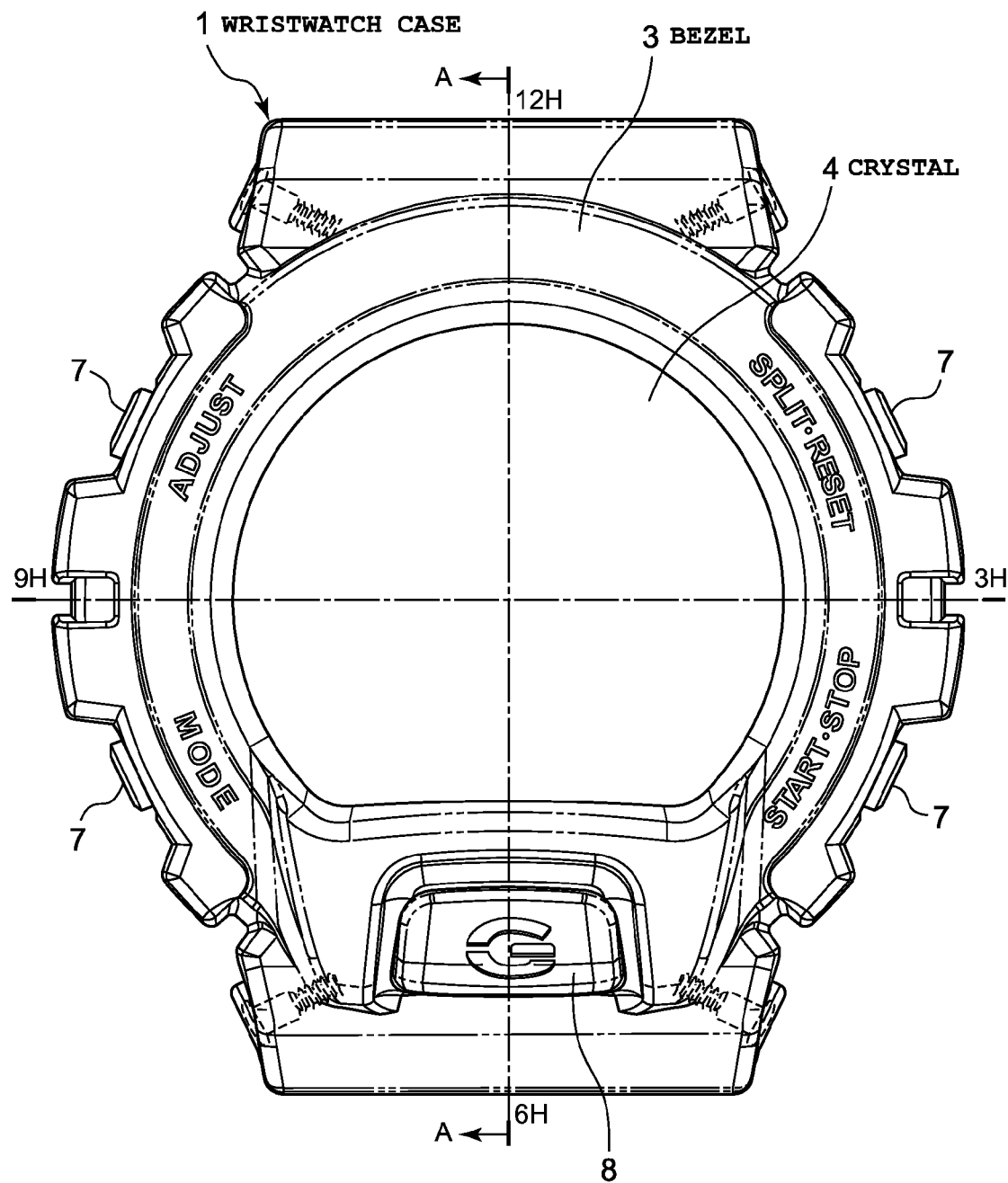
FIG. 1 is an enlarged front view of an embodiment in which the present invention has been applied to a wristwatch.
Figure 2:
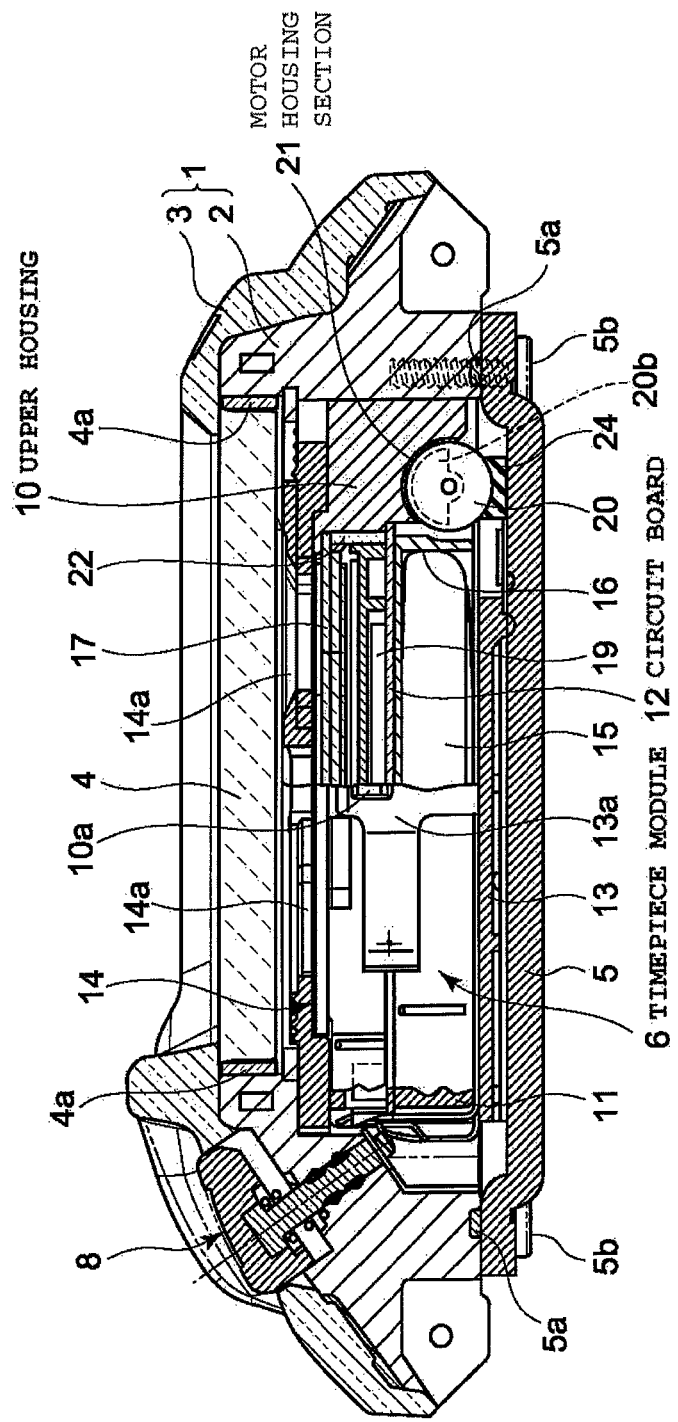
FIG. 2 is an enlarged cross-sectional view of the wristwatch taken along line A-A in FIG. 1.

This wristwatch includes a wristwatch case 1, as shown in FIG. 1 and FIG. 2.

The wristwatch case 1 is structured such that a bezel 3 made of a soft synthetic resin, such as urethane resin, is provided in the outer periphery of a case body 2 made of a hard synthetic resin, metal, or the like.

In this instance, a crystal 4 is attached on the upper opening portion of the wristwatch case 1 via a gasket 4a, and a case back 5 is attached on the undersurface of the wristwatch case 1 by screws 5b via a water-proofing ring 5a.

In addition, a timepiece module 6 is arranged inside the wristwatch case 1, as shown in FIG. 2.

Moreover, a plurality of button switches 7 are provided on the side surface of the wristwatch case 1 as shown in FIG. 1, and a front switch 8 is provided on the 6 o'clock side of the top surface of the wristwatch case 1 as shown in FIG. 1 and FIG. 2.

As shown in FIG. 2, the timepiece module 6 includes an upper housing 10 and a lower housing 11 made of a hard synthetic resin, and a circuit board 12 is arranged between these upper and lower housings 10 and 11.

Figure 5:
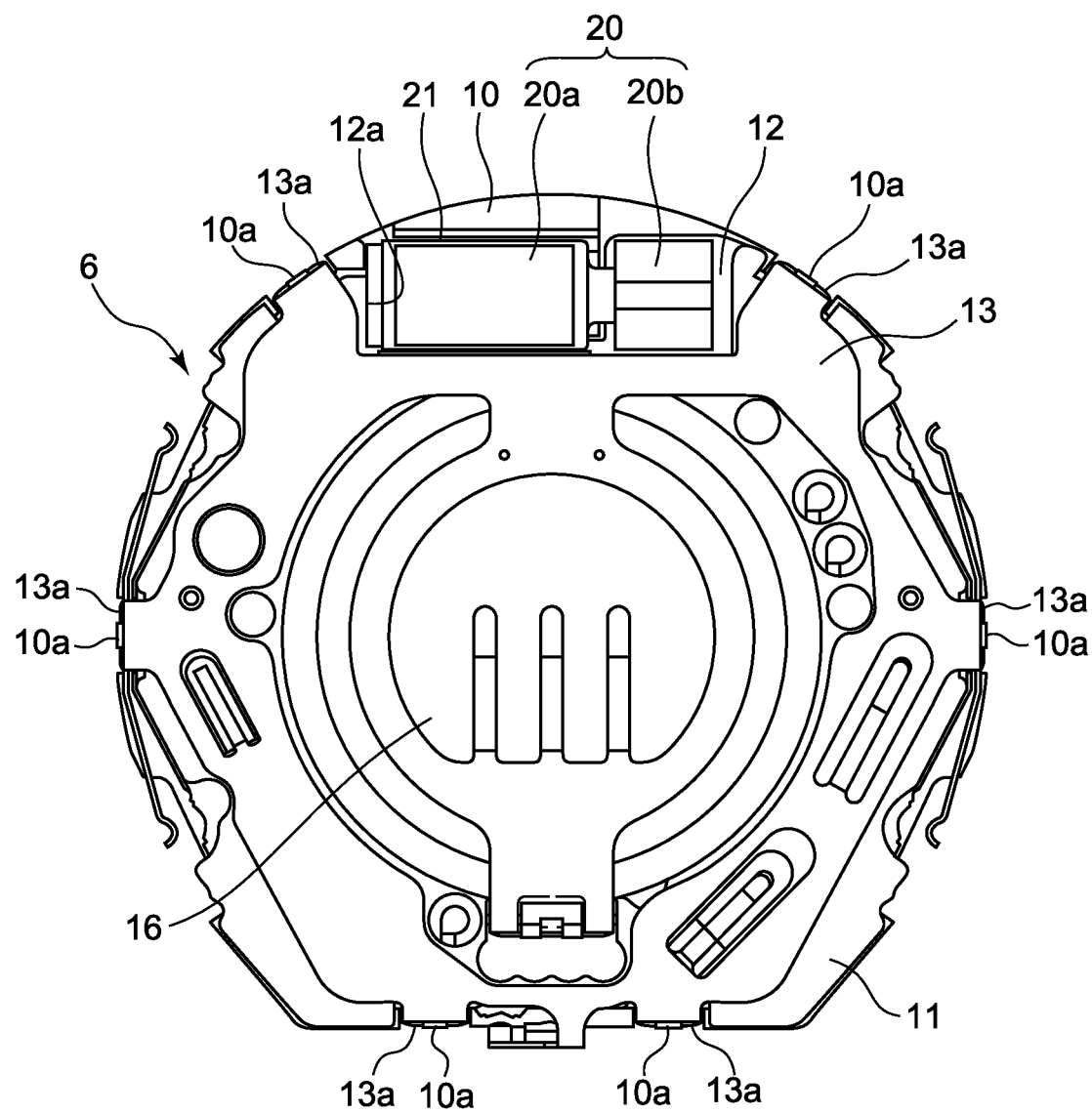
FIG. 5 is an enlarged rear view of the timepiece module of the wristwatch shown in FIG. 2.
Figure 6:
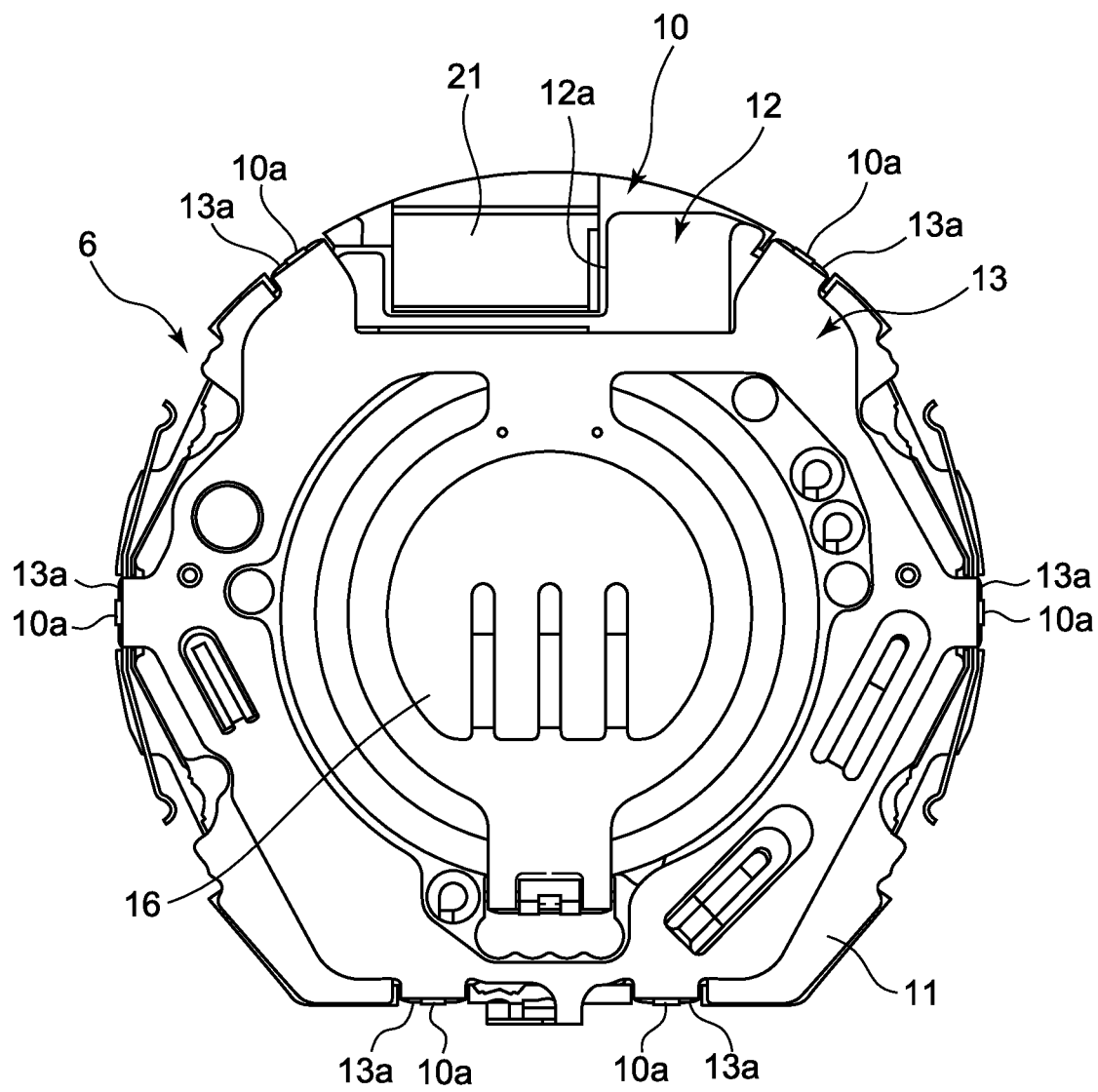
FIG. 6 is also an enlarged rear view of the timepiece module shown in FIG. 5, in which the vibrating motor has been removed.
Figure 7:
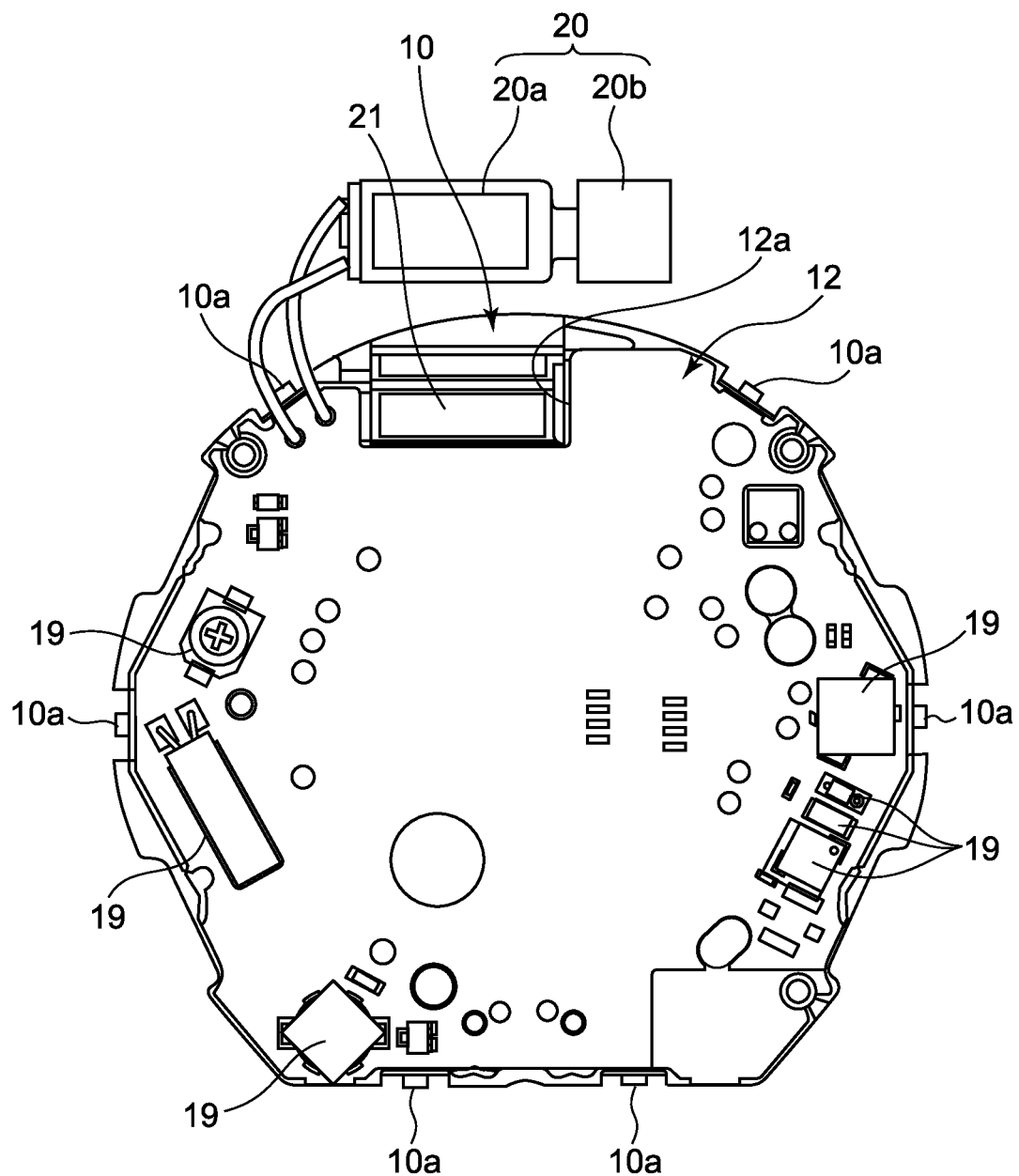
FIG. 7 is an enlarged rear view of the circuit board of the timepiece module shown in FIG. 5.
Figure 8:
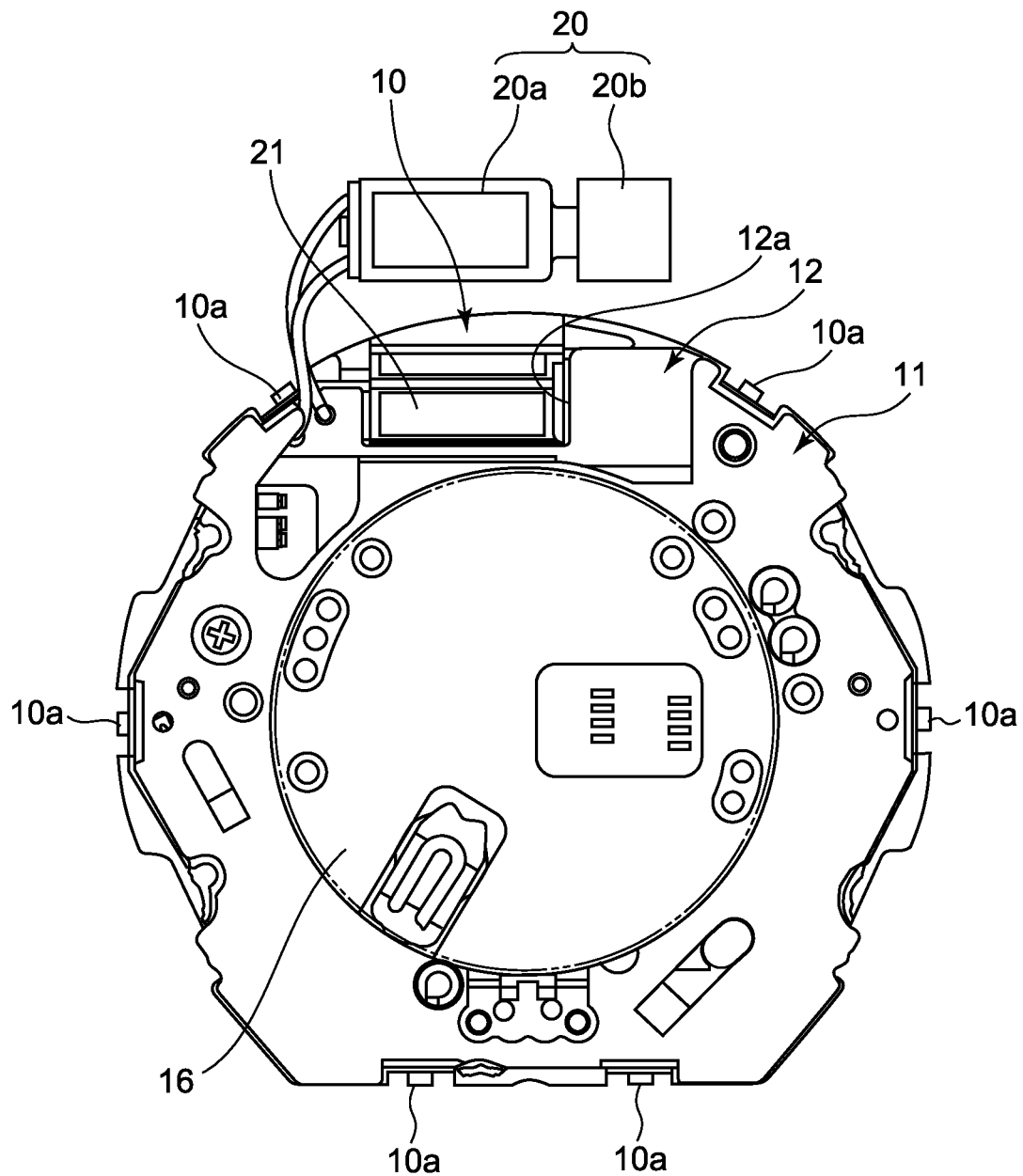
FIG. 8 is also an enlarged rear view of the circuit board of the timepiece module shown in FIG. 7, in which the lower housing has been arranged thereon.

On the undersurface of the lower housing 11, a ground plate 13 is arranged, and a plurality of hook sections 13a are provided on the peripheral portion of this ground plate 13, as shown in FIG. 5.

These hook sections 13a are structured to be locked to locking sections 10a provided on the side surface of the upper housing 10, as shown in FIG. 2 and FIG. 5.

As a result, the hook sections 13a of the ground plate 13 arranged on the undersurface of the lower housing 11 are locked to the locking sections 10a provided on the side surface of the upper housing section 10, with the circuit board 12 being held between the upper housing 10 and the lower housing 11, as shown in FIG. 2. Accordingly, the upper housing 10 and the lower housing 11 are integrally mounted in the wristwatch case 1.

Figure 3:
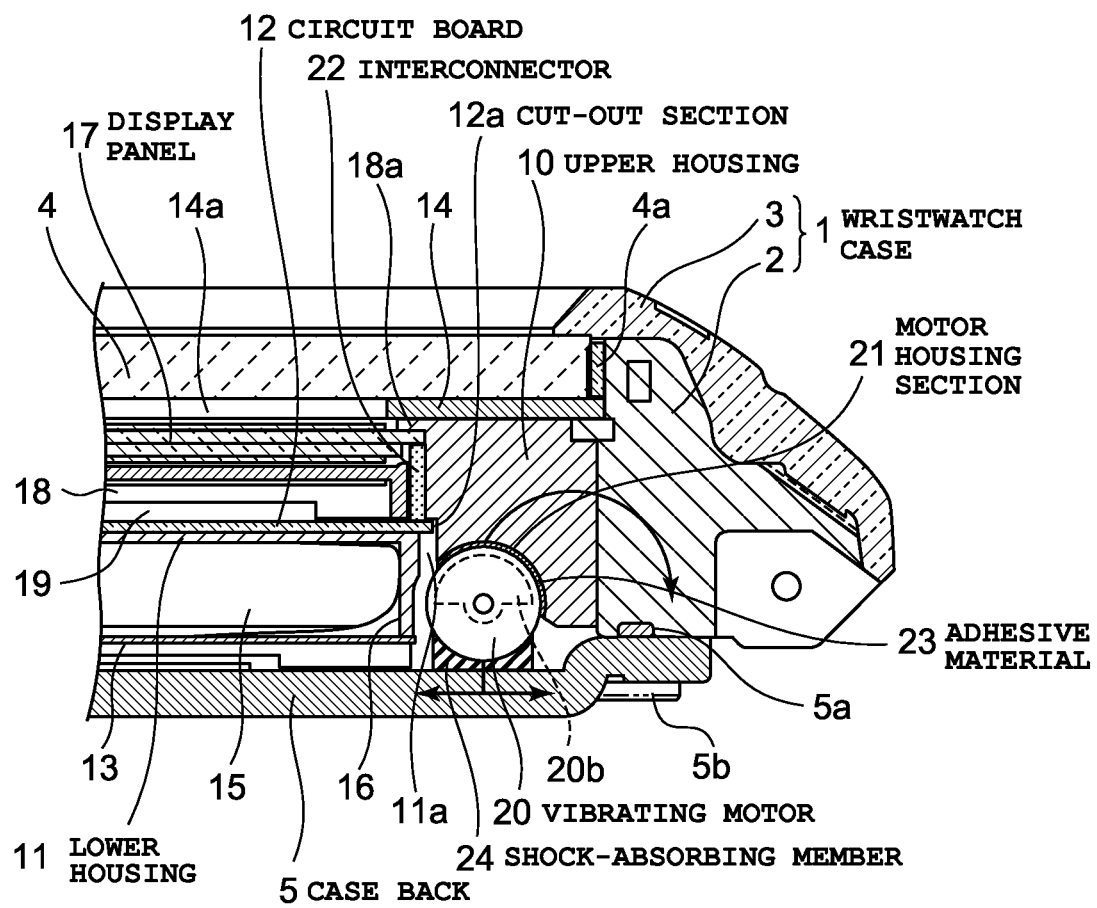
FIG. 3 is a further enlarged cross-sectional view of the wristwatch in FIG. 2, which is showing the main section thereof.
Figure 4:
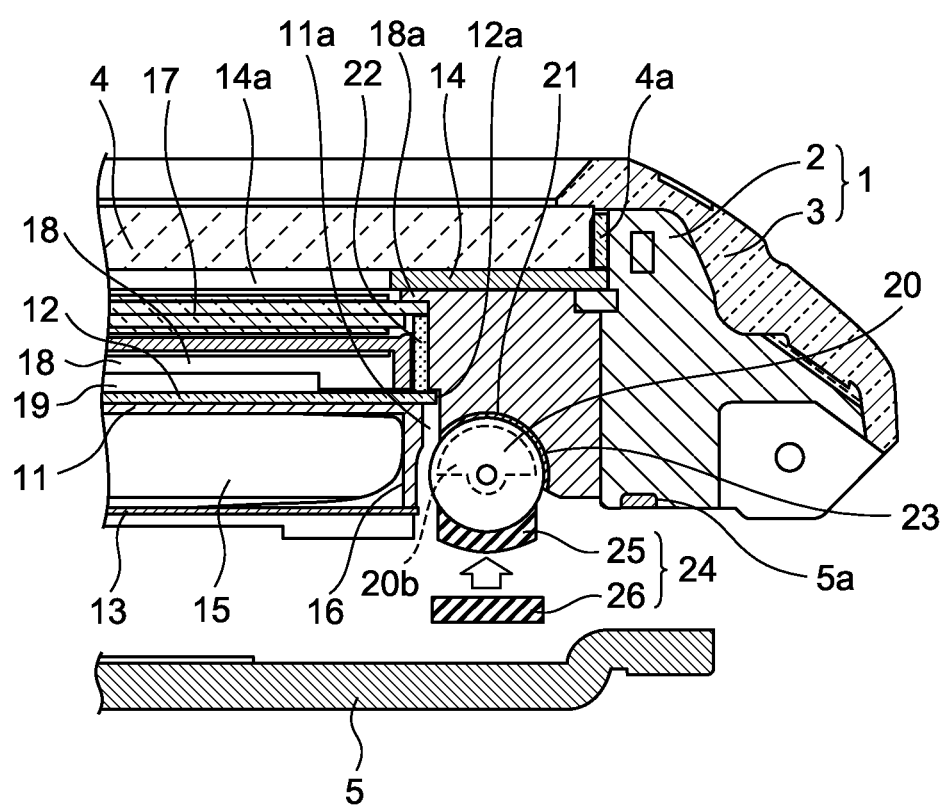
FIG. 4 is a cross-sectional view of the main section of the wristwatch shown in FIG. 3, in which the case back has been removed and separated from the wristwatch case.

In this instance, a dial 14 having a plurality of display window sections 14a is arranged on the top surface of the upper housing 10, as shown in FIG. 2 to FIG. 4.

In addition, a battery housing section 16 that is open downward and detachably houses a battery 15 is provided in the lower housing 11, as shown in FIG. 2 to FIG. 6.

Moreover, a panel housing section 18 that houses a display panel 17 and a motor housing section 21 that houses a vibrating motor 20 are provided in the upper housing 10, as shown in FIG. 2 and FIG. 3.

This panel housing section 18 is an opening portion provided to pass through substantially the center of the upper housing 10 in a vertical direction.

On the upper edge portion of the inner peripheral surface of this opening portion, a shoulder section 18a with which the underside of the edge portion of the display panel 17 comes in contact is provided to project inward.

The display panel 17 is constituted by a flat-screen display element, such as a liquid crystal display element or an electroluminescent (EL) display element.

This display panel 17 electro-optically displays information such as the time, and the displayed information is seen from the outside through the plurality of display window sections 14a of the dial 14.

The side portions of the display panel 17 are elastically supported by interconnectors 22 to be within the panel housing section 18, as shown in FIG. 2 to FIG. 4.

These interconnectors 22 are structured by an alternating array of conductive rubber and insulating rubber, and used to electrically connect the display panel 17 and the circuit board 12, as shown in FIG. 2 to FIG. 4.

In this instance, the interconnectors 22 are arranged between electrode sections (not shown) on the sides of the display panel 17 and the connection electrode (not shown) of the circuit board 12.

The upper end portions of the interconnectors 22 elastically press the side edges of the display panel 17 from below against the shoulder section 18a of the panel housing section 18, and the lower end portions are elastically pressed against the top surface of the circuit board 12.

As a result, the display panel 17 is elastically supported to be within the panel housing section 18 by the interconnectors 22, as shown in FIG. 2 to FIG. 3.

The circuit board 12 is elastically arranged in a non-contact state with slight spacing between it and the upper housing 10, so as not to come in contact with the upper housing 10 by the interconnectors 22.

On the top surface and the undersurface of this circuit board 12, various electronic components 19 required for timepiece functions, such as a large-scale integrated circuit (LSI) and a crystal oscillator, are provided.

The motor housing section 21 is provided underneath a portion of the upper housing 10 on the 12 o'clock side, which is open downward.

In this instance, a cut-out section 12a is provided corresponding to the motor housing section 21 in the circuit board 12 to secure a mounting space for the vibrating motor 20.

As a result, a portion of the upper housing 10 projects below the circuit board 12 through the cut-out section 12a in the circuit board 12, without coming in contact with the circuit board 12.

This downwardly projecting portion of the upper housing 10 is inserted into a cut-out section 11a of the lower housing 11 without coming in contact with the lower housing 11, as shown in FIG. 3 and FIG. 4.

Consequently, the lower end portion of the upper housing 10 is positioned near the inner surface of the case back 5 without coming in contact therewith.

As a result, the motor housing section 21 provided in the downwardly projecting portion of the upper housing 10 is positioned below the circuit board 12.

This portion of the upper housing 10, in which the motor housing section 21 is provided, is arranged within the case body 2 of the wristwatch case 1 with the outer peripheral surface thereof being in close contact with the inner surface of the case body 2, as shown in FIG. 3 and FIG. 4.

In this instance, a side surface portion of the motor housing section 21 positioned on the battery housing section 16 side of the lower housing 11 is open toward the cut-out section 11a of the lower housing 11.

The vibrating motor 20 includes a motor main body section 20a and a vibration generating section 20b which are housed within the motor housing section 21, as shown in FIG. 3 to FIG. 5.

The motor main body section 20a is structured such that a coil generates a magnetic field, and the generated magnetic field rotates a rotor.

The vibration generating section 20b is structured to generate vibrations by eccentrically rotating its weight portion by the rotation of the rotor.

This vibrating motor 20 is structured such that, the motor main body section 20a is fixed to the inner surface of the motor housing section 21 by an adhesive material 23 such as a double-sided adhesive tape, without the vibration generating section 20b coming in contact with the motor housing section 21 or the circuit board 12.

In this instance, the vibrating motor 20 is arranged within the cut-out section 11a of the lower housing 11 without the outer peripheral surface thereof coming in contact with the battery housing section 16 of the lower housing 11, as shown in FIG. 3 and FIG. 4.

In addition, the outer peripheral surface of the motor main body section 20a projecting downward from the motor housing section 21 is elastically pressed against the inner surface of the case back 5 via a shock-absorbing member 24, as shown in FIG. 3 and FIG. 4.

The shock-absorbing member 24 includes a protective member 25 arranged on the lower outer peripheral surface of the motor main body section 20a and an elastic member 26 arranged between the protective member 25 and the case back 5.

The protective member 25 is formed by a hard material made of polycarbonate synthetic resin filled with a reinforcement material such as metal particles, and protects the vibrating motor 20.

The elastic member 26 is formed by a soft elastic material such as silicone or urethane rubber or an elastomer, and fills the space between the protective member 25 and the case back 5 by being compressed and deformed by the protective member 25 and the case back 5.

When the case back 5 is arranged underneath the wristwatch case 1 and fastened by the screws 5b as shown in FIG. 4, the elastic member 26 of the shock-absorbing member 24 is compressed and deformed by the fastening force of the screws 5b, and then presses the hard protective member 25 against the vibrating motor 20.

As a result, the elastic member 26 fills the space between the vibrating motor 20 and the case back 5, and presses the vibrating motor 20 into the motor housing section 21.

Next, the mechanism of the above-described vibrating motor 20 will be described.

When the vibrating motor 20 is driven and generates vibration by the vibration generating section 20b, the vibration is transmitted to the upper housing 10.

That is, since the lower outer periphery of the vibrating motor 20 housed within the motor housing section 21 of the upper housing 10 has been pressed upward by the case back 5 via the shock-absorbing member 24, and the vibrating motor 20 has been pressed into the motor housing section 21 thereby, the vibration of the vibrating motor 20 is unfailingly and favorably transmitted to the upper housing 10.

The vibration transmitted to the upper housing 10 is then transmitted to the case body 2 of the wristwatch case 1, whereby the wristwatch case 1 vibrates.

That is, since the upper housing 10 has been arranged within the case body 2 of the wristwatch case 1 with a portion of its outer peripheral surface provided with the motor housing section 21 being in close contact with the inner surface of the case body 2, the vibration of the upper housing 10 is unfailingly transmitted to the case body 2 as indicated by the arrow in FIG. 3, whereby the wristwatch case 1 favorably vibrates.

This vibration of the vibrating motor 20 is also transmitted to the case back 5 via the shock-absorbing member 24, and vibrates it.

That is, the shock-absorbing member 24 includes the protective member 25 arranged on the lower outer peripheral surface of the motor main body section 20a and the elastic member 26 arranged between the protective member 25 and the case back 5, as described above. When the case back 5 is arranged underneath the wristwatch case 1 and fastened by the screws 5b, the elastic member 26 of the shock-absorbing member 24 is compressed and deformed by the fastening force of the screws 5b, and presses the hard protective member 25 against the vibrating motor 20. As a result of this structure, the vibration of the vibrating motor 20 is transmitted to the case back 5 as indicated by the arrows in FIG. 3.

Even when the vibration of the vibrating motor 20 is transmitted to the upper housing 10, the circuit board 12 and the lower housing 11 do not receive much vibration.

That is, the circuit board 12 is arranged in a non-contact state with a slight spacing between it and the upper housing 10, so as not to come in contact with the upper housing 10 via the interconnectors 22.

As a result, vibration transmitted to the upper housing 10 is controlled not to be transmitted to the circuit board 12.

In this instance, the interconnectors 22, which electrically connect the display panel 17 housed in the panel housing section 18 of the upper housing 10 with the circuit board 12, are structured by the alternating array of conductive rubber and insulating rubber, and elastically arranged between the display panel 17 and the circuit board 12.

Therefore, the interconnectors 22 can elastically absorb vibration transmitted to the upper housing 10 in a manner that the vibration is not transmitted to the circuit board 12.

Accordingly, adverse effects on the circuit board 12 by the vibration of the vibrating motor 20 can be prevented.

As a result, damage or breakdown of the various electronic components 19 such as the LSI and the crystal oscillator provided on the top surface and the undersurface of the circuit board 12 can be prevented from occurring.

The lower housing 11 is also arranged without coming into contact with the upper housing 10, and accordingly vibration transmitted to the upper housing 10 is not transmitted to the lower housing 11.

Therefore, even when the upper housing 10 is being vibrated by vibration of the vibrating motor 20, the vibration is not transmitted to the circuit board 12 by the lower housing 11, and the circuit board 12 is not adversely affected by the vibration of the vibrating motor 20.

As a result, damage or breakdown of the various electronic components 19 such as the LSI and the crystal oscillator provided on the top surface and the undersurface of the circuit board 12 can be prevented from occurring.

As described above, in the attachment structure for the vibrating motor 20 where the circuit board 12 provided with the cut-out section 12a for forming a mounting space for the vibration motor 20 is arranged within the upper housing 10 which is arranged inside the wristwatch case 1 and houses the vibrating motor 20, the upper housing 10 is housed inside the wristwatch case 1 with a portion thereof that corresponds to the vibrating motor 20 being in close contact with the inner surface of the wristwatch case 1, and the circuit board 12 is arranged in a non-contact state relative to the upper housing 10.

As a result, the size of the entire wristwatch can be reduced, adverse effects on the circuit board 12 by the vibration can be prevented, and the vibration can be efficiently transmitted to the wristwatch case 1 while preventing damage or breakdown of the various electronic components 19 such as the LSI and the crystal oscillator provided on the top surface and the undersurface of the circuit board 12.

That is, in this attachment structure for the vibrating motor 20, the vibrating motor 20 is housed within the motor housing section 21 provided in the upper housing 10, and a portion of the upper housing 10 which corresponds to the motor housing section 21 is in close contact with the inner surface of the wristwatch case 1.

As a result, the vibration generated by the vibrating motor 20 can be unfailingly transmitted to the upper housing 10, and the vibration of the vibrating motor 20 can be unfailingly and favorably transmitted to the wristwatch case 1 via the upper housing 10.

In addition, in the attachment structure for the vibrating motor 20, the circuit board 12 is arranged in a non-contact state relative to the upper housing 10. Therefore, the vibration of the vibrating motor 20 transmitted to the upper housing 10 can be controlled so as to not be transmitted to the circuit board 12.

As a result, the circuit board 12 can be prevented from vibrating, and whereby adverse effects on the circuit board 12 by the vibrations can be prevented. In addition, the motor housing section 21 of the upper housing 10 can be formed in the same size as that of the vibrating motor 20, whereby the mounting space of the vibrating motor 20 can be minimized, and the size of the entire wristwatch can be sufficiently reduced.

That is, in the attachment structure for the vibrating motor 20, the circuit board 12 is attached to the upper housing 10 with spacing therebetween via the interconnectors 22 that are elastic members.

As a result of this structure, the circuit board 12 can be arranged in a non-contact state relative to the upper housing 10 and, even when the upper housing 10 is vibrated by the vibration of the vibrating motor 20, the vibration can be elastically absorbed by the interconnectors 22.

As a result, adverse effects on the circuit board 12 by the vibration of the vibrating motor 20 can be prevented. Damage or breakdown of the various electronic components 19 such as the LSI and the crystal oscillator provided on the top surface and the undersurface of the circuit board 12 can be prevented from occurring.

In this instance, the interconnectors 22, which are elastic members, are structured to electrically connect the display panel 17 attached to the upper housing 10 and the circuit board 12, in a state of being arranged therebetween with elasticity.

Accordingly, the number of the components is not increased, and therefore slight spacing can be elastically provided between the circuit board 12 and the upper housing 10 using an existing structure.

In addition, the circuit board 12 can be arranged in a non-contact state relative to the upper housing 10.

As a result, adverse effects on the circuit board 12 by the vibration of the vibrating motor 20 can be prevented.

Moreover, in the attachment structure for the vibrating motor 20, the vibrating motor 20 is pressed into the motor housing section 21 of the upper housing 10 by the case back 5 of the wristwatch case 1 via the shock-absorbing member 24.

Therefore, the vibration of the vibrating motor 20 can be unfailingly and favorably transmitted to the upper housing 10, and can also be transmitted to the case back 5 via the shock-absorbing member 24. As a result, the case back 5 can also be favorably vibrated.

In this instance, the shock-absorbing member 24 includes the protective member 25 arranged on the lower outer peripheral surface of the motor main body section 20a and the elastic member 26 arranged between the protective member 25 and the case back 5, as described above. When the case back 5 is arranged underneath the wristwatch case 1 and fastened by the screws 5b, the elastic member 26 of the shock-absorbing member 24 is compressed and deformed by the fastening force of the screws 5b, and unfailingly presses the hard protective member 25 against the vibrating motor 20.

As a result of this structure, the vibration of the vibrating motor 20 can be unfailingly and favorably transmitted to the case back 5.

Furthermore, in the attachment structure for the vibrating motor 20, although a portion of the upper housing 10 corresponding to the motor housing section 21 downwardly projects through the cut-out section 12a of the circuit board 12, this downwardly projecting portion is inserted into the cut-out section 11a of the lower housing 11 arranged underneath the circuit board 12 without coming in contact therewith.

Therefore, even when the upper housing 10 vibrates by the vibration of the vibrating motor 20, the vibration is not transmitted to the lower housing 11.

As a result, adverse effects on the circuit board 12 by the vibration of the vibrating motor 20 can be prevented.

In the structure of the above-described embodiment, the side surface portion of the motor housing section 21 of the upper housing 10 which is located on the battery housing section 16 side of the lower housing 11 opens into the cut-out section 11a of the lower housing 11.

Figure 9:
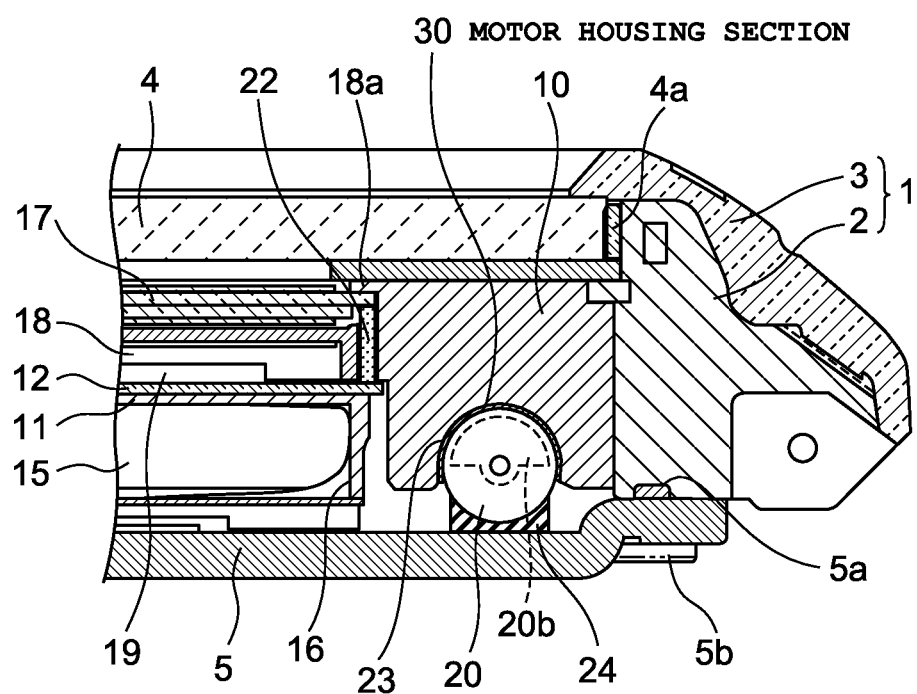
FIG. 9 is an enlarged cross-sectional view showing the main section of a variation example of the embodiment in which the present invention has been applied to a wristwatch.

However, the side surface portion of the motor housing section 21 is not necessarily required to open into the cut-out section 11a of the lower housing 11, and a structure such as that of a variation example shown in FIG. 9 may be adopted.

Specifically, in the variation example, a motor housing section 30 formed into a semi-circular cylindrical shape is provided in the upper housing 10.

With this structure, the vibrating motor 20 can be unfailingly and favorably housed within the motor housing section 30, whereby vibration generated by the vibrating motor 20 can be unfailingly transmitted to the upper housing 10, and the wristwatch case 1 can be favorably vibrated.

In addition, in the structures of the above-described embodiment and the variation example, a portion of the upper housing 10 where the motor housing section 21 for housing the vibrating motor 20 is located projects below the circuit board 12 via the cut-out section 12a of the circuit board 12.

However, this portion of the upper housing 10, in which the motor housing section 21 is located, is not necessarily required to project below the circuit board 12, and a structure may be adopted in which the portion of the upper housing 10, in which the motor housing 21 is located, is arranged within the cut-out section 12a of the circuit board 12, and the vibrating motor 20 is accordingly arranged above the circuit board 12.

Moreover, in the above-described embodiment and the variation examples, the present invention has been applied to a pointer type wristwatch.

However, the present invention is not necessarily required to be applied to a wristwatch and may be applied to various pointer type electronic clocks, such as travel clocks, alarm clocks, mantelpiece clocks, and wall clocks.

In addition, the present invention is not necessarily required to be applied to a clock, and may be widely applied to electronic devices such as mobile phones.

While the present invention has been described with reference to the preferred embodiments, it is intended that the invention be not limited by any of the details of the description therein but includes all the embodiments which fall within the scope of the appended claims.

What is claimed is:

1. An attachment structure comprising:
   a housing which is arranged within a device case and which houses a vibrating motor; and
   a circuit board which is provided with a cut-out section for forming a mounting space for the vibrating motor,
   wherein the housing is housed within the device case with a portion of the housing that corresponds to the vibrating motor being in close contact with an inner surface of the device case,
   wherein the circuit board is attached to the housing with spacing therebetween via an elastic member, and
   wherein the elastic member is an interconnector that electrically connects a display panel attached to the housing and the circuit board in a state of being arranged between the display panel and the circuit board with elasticity.

2. The attachment structure according to claim 1, wherein the vibrating motor is pressed into the housing by a back portion of the device case via a shock-absorbing member.

3. An electronic device comprising:
   a device case;
   a housing which is arranged within the device case and which houses a vibrating motor; and
   a circuit board which is provided with a cut-out section for forming a mounting space for the vibrating motor and arranged in the housing,
   wherein the housing is housed within the device case with a portion of the housing that corresponds to the vibrating motor being in close contact with an inner surface of the device case,
   wherein the circuit board is attached to the housing with spacing therebetween via an elastic member, and
   wherein the elastic member is an interconnector that electrically connects a display panel attached to the housing and the circuit board in a state of being arranged between the display panel and the circuit board with elasticity.

* * * * *